United States Patent Office 2,977,803
Patented Apr. 4, 1961

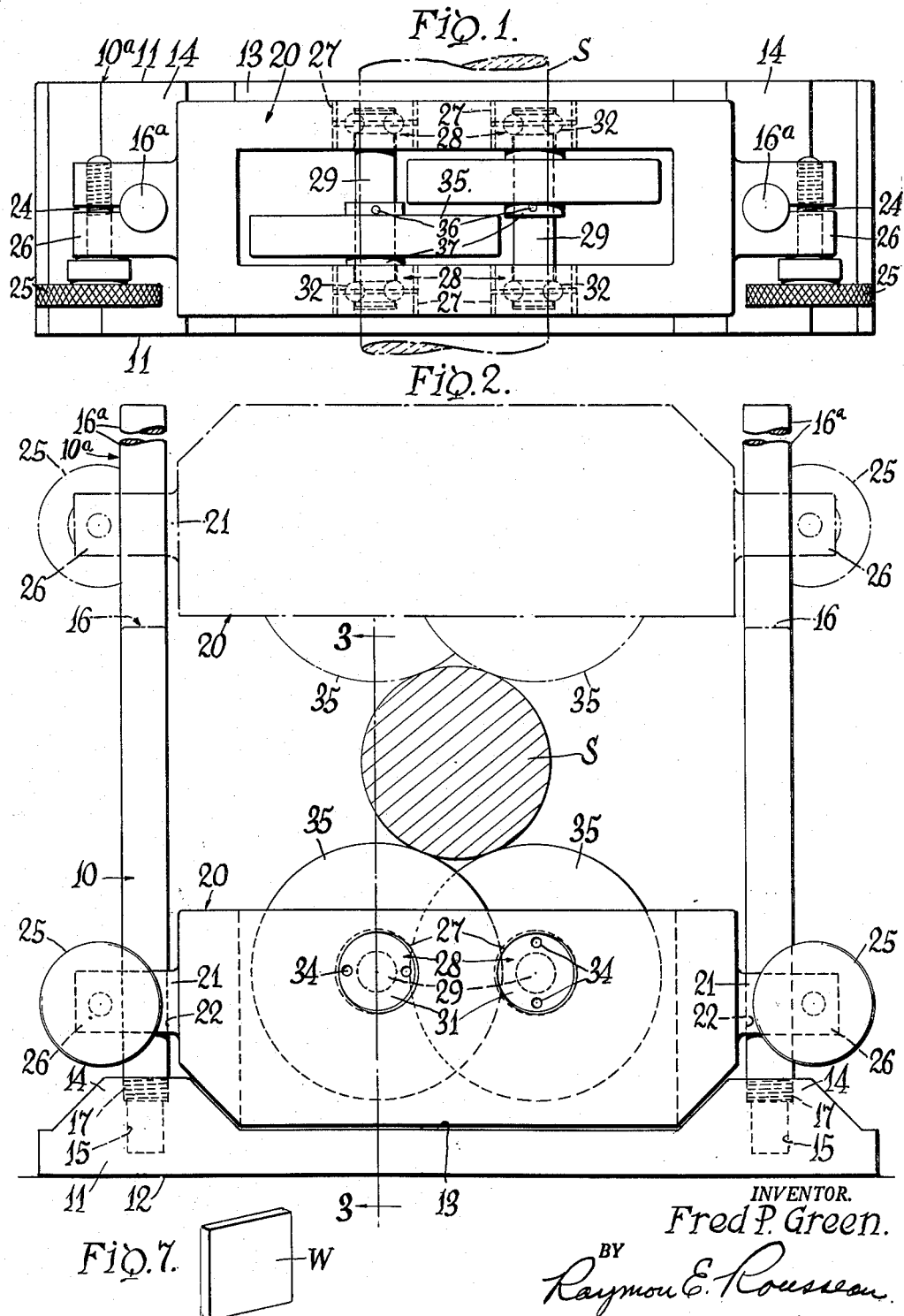

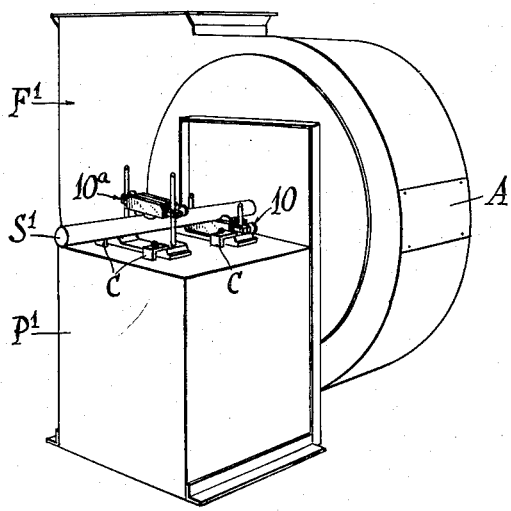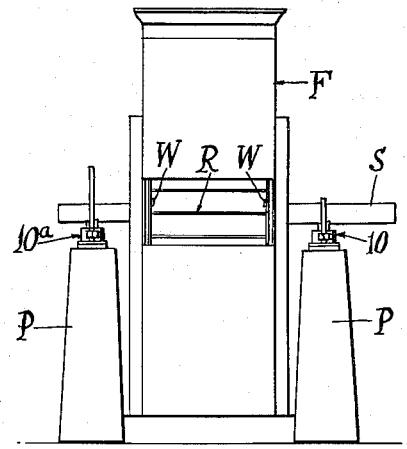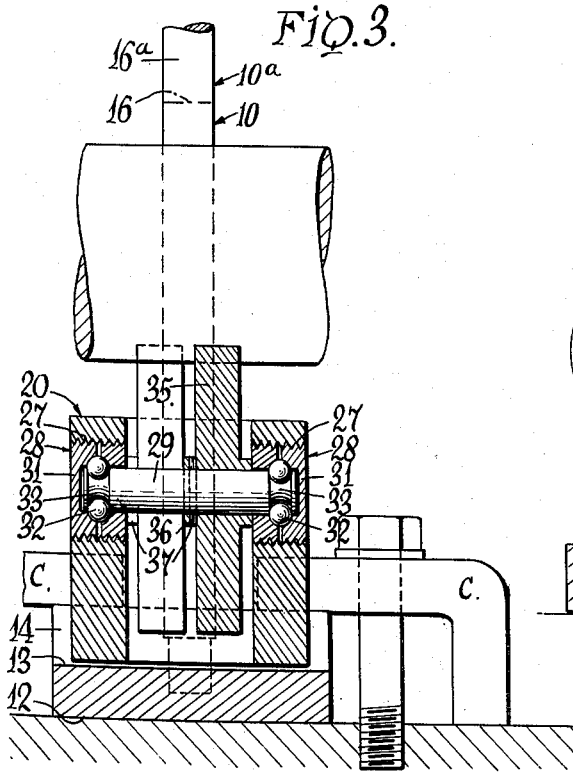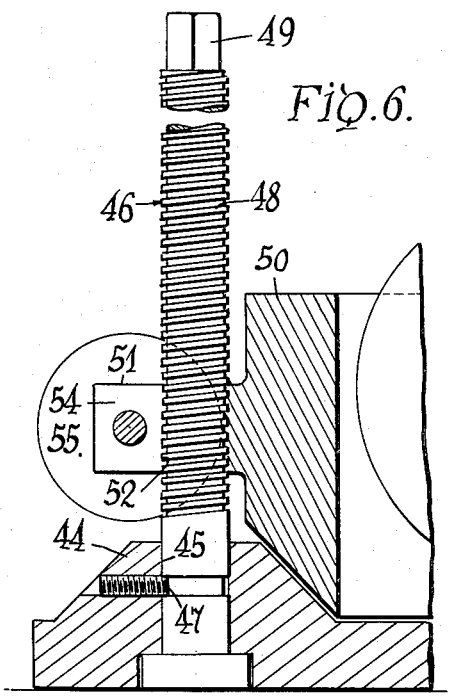

2,977,803

APPARATUS FOR STATICALLY BALANCING ROTATABLE ELEMENTS

Fred P. Green, Big Tree Road, Strykersville, N.Y.

Filed Aug. 8, 1956, Ser. No. 602,892

4 Claims. (Cl. 73—481)

My invention relates to the art of balancing rotatable elements of machines and more particularly to an improved apparatus for statically balancing rotatable elements of machines.

The present practice is to balance the rotatable elements of various machines within permissible imbalance tolerances during their manufacture or assembly by using more or less elaborate and costly dynamic or static balancing mechanisms. These prior mechanisms are being used in production balancing operations, but it has been found impractical and economically unfeasible to transport and use such mechanisms in balancing operations in the field. One reason such prior mechanisms have proven unsatisfactory in the field is that their use requires considerable time-consuming work to prepare the machine for a balancing operation. Other reasons are the cost of transporting such balancing mechanisms to the place where the machine to be balanced is located and the costs of sending skilled service personnel to the job for the balancing operation.

Notwithstanding this costly prior procedure there have been instances where it has been impossible to satisfactorily balance the machine in the field so that the additional expense of shipping the machine back to the manufacturer, locating and correcting its imbalance and then returning it to the user has been necessary.

The necessity for rebalancing the rotatable elements of a machine may arise from various causes among which are faulty installation and slight shipping damage resulting in sufficient eccentricity or misalignment of the rotatable elements to cause objectionable vibrations or from an uneven accumulation of foreign matter on the rotatable elements and especially from distortions, uneven wear and uneven corrosion of the rotatable element.

When, for example, an industrial fan develops excessive vibrations due to an uneven accumulation of foreign matter on its rotor blades, the accumulations are removed, however since the vibration also usually results from an uneven wear or corrosion of the blades of the rotor it must be rebalanced to bring the vibration within permissible limits.

The rebalancing of the rotating elements of machines, especially large machines, by using prior balancing mechanisms has been very difficult, if not impossible, time-consuming and expensive.

The objects of my invention are to provide improved balancing mechanisms usable directly on a machine to statically balance its rotatable elements within permissible limits of imbalance; to provide a plurality of pairs of improved balancing ways, each pair of which is adapted to support a range of sizes of rotatable elements; to provide improved balancing ways adopted to be substituted for the bearings of machines to support their rotatable elements in their normal running positions and to allow the speedy location and correction of their imbalance; to provide improved balancing ways which because of their simple, light and compact construction may be more readily transported and used in production and field balancing operations and which may be made and sold at less cost than the cost of an extensive rebalancing operation; and to provide an improved apparatus for statically balancing rotatable elements that does not require the prior step of running such elements.

These and other objects of my invention will appear from a perusal of the drawings and the following detailed description.

In the drawings:

Figure 1 is a top plan view of one of my improved balancing ways.

Figure 2 is a side elevational view of the way of Figure 1. One position of use of my adjustable supporting member being shown in full lines and another position of use being shown in dot and dash lines.

Figure 3 is a cross sectional view of Fig. 2, looking in the direction of the arrows and shows a clamping device for securing the way in the space normally occupied by a bearing pillow block.

Figure 4 is a front elevational view of one type of industrial exhaust fan having its bearing blocks removed and a pair of my ways substituted therefor to support the fan rotor in its normal running position ready for a static balancing operation.

Figure 5 is a perspective view of another type of fan and illustrates how my improved ways are arranged to support its rotor in its normal running position.

Figure 6 is a fragmentary longitudinal sectional view of one end of a heavy-duty type of my way.

Figure 7 is a perspective view of one of a graduated series of like temporary and permanent balancing weights.

Before describing my invention in detail it should be pointed out that objectionable vibration of a rotating element is usually due to an imbalanced condition and that from extended experience in the art of balancing such elements it has been found that in the vast majority of cases such condition is due to a static imbalance. Accordingly my invention is directed to an improved static balancing apparatus including improved portable static balancing ways and weights, the former being adapted to be substituted for the pillow block bearings of a rotatable element of a machine to support the element in its normal running position in the machine during an imbalance locating and correcting balancing operation, and the latter being readily applied to the element to locate and correct a static imbalance condition.

Referring now to the drawings, it will be seen that a pair of my improved portable static balancing ways generally indicated by the numerals 10 and 10a, comprise a set and each includes a rectangularly-shaped support or base plate 11 having a flat bottom surface 12 and a flat top surface 13 terminating in an inverted somewhat V-shaped transversely disposed enlargement or rib 14 adjacent each of its ends. The center of each of the ribs 14 is provided with a vertical hole 15 to receive and support a rod or shaft 16 in an upright position so that the axes of the shafts are parallel and normal to the plane of the flat bottom surface 12. The only difference between the ways 10 and 10a is that the shafts 16a of the latter are made longer than the shafts 16 of the way 10 for a purpose to be described later. The shafts 16 and 16a may be permanently secured in their respective holes, but are preferably detachably secured in place as by the threaded connection indicated at 17, thereby allowing their ready removal so that the ways may be more readily transported.

A rectangularly-shaped carrier frame 20 has each of its ends formed with a lug 21 which lugs are each provided with a vertical bore 22 spaced and of a size to slidably fit upon the shafts 16 or 16a of either of the ways 10 or 10a. The lugs 21 being slotted as at 24 are each provided with a thumbscrew 25 to form clamps 26 which when the thumbscrews 25 are tightened grip the rods and securely hold the frame in each of its multitude of different adjusted positions.

The sides of the frame are provided with spaced and axially alined pairs of through openings 27 in each of which a ball bearing 28 is secured to rotatably support a pair of spaced axially alined shafts 29. The openings 27 are preferably threaded to threadably receive the bearings 28 and each of the latter are preferably formed of a pair of relatively adjustable raceways 31 formed to receive therebetween a plurality of ball bearings 32 which are positioned to engage in a groove or raceway 33 formed in each end of the shafts 29. This arrangement allows the bearings to be finely adjusted to allow the desired free rotation of their shaft without appreciable radial or axial play. The raceways 31 have a threaded fit with their opening 27 so that they retain their adjustment without requiring separate locking means, and their outer faces are provided with a pair of spanner wrench holes 34 providing for their adjustment by a spanner wrench (not shown).

Each shaft 29 has a disc or way roller 35 secured thereon by a pin 36 passed through one of the roller hubs 37 to locate the roller toward one end of its shaft thereby positioning the rollers in spaced side by side relation, as shown in Figure 1. So secured and positioned the rollers rotate freely and independently of each other and being located so that their peripheries extend above their frame serve to rotatably support a range of sizes of shafts S in the manner shown in Figure 2.

It is contemplated that a relatively few pairs of different sizes of my ways 10 and 10a may be substituted for the bearings of a wide range of sizes of rotatable elements of machines and adjusted to rotatably support such elements in their normal running position during a static balancing operation.

By referring to Figure 4, it will be seen that bearings for shaft S of the fan rotor R of an industrial type of air fan F have been removed from their pedestals P, and a pair of my ways (10 and 10a) have been substituted therefor and positioned and adjusted to support the shaft and fan rotor in their normal running position. Upon removing an access plate of the fan the fan rotor R is accessible to allow the application of suitable weights thereto to locate and overcome its imbalance by a static balancing method hereinafter to be described.

In the type of industrial fan $F^1$ illustrated in Figure 5, the bearings for the shaft $S^1$ have been removed from their supporting pedestal $P^1$ and a pair of my balancing ways 10 and 10a have been substituted therefor and positioned and adjusted to support the shaft $S^1$ and its fan rotor (not shown) in their normal running positions.

It will be apparent that in the fan shown in Figure 5 the shaft $S^1$ exerts a downward force on the innermost way 10 and a lifting force on the outermost way 10a and for this reason its base must be clamped to the top surface of the pedestal $P^1$ by suitable clamps C and its rods 16a must be long enough to allow its frame 20 to be adjusted and secured thereupon in an inverted elevated position in which its rollers overlie and engage the shaft, as shown in Figure 5 and as indicated in dot and dash lines in Figure 2. With the shaft $S^1$ thus supported and the access plate A removed the imbalance of the rotor of the fan $F^1$ may be readily located and corrected.

Aside from the necessity of providing the clamps C for the way 10a when the shaft of the rotatable element is supported in the manner shown in Figure 5 the clamps C need be used only when conditions indicate their use is advisable. It will be noted that since the frames 20 are provided with a flat bottom surface which is parallel to the axes of the shafts 29, they may be removed from their rods 16 or 16a and advantageously used as non-adjustable balancing ways independently of their base.

Since the weight of rotatable elements requiring periodic balancing ranges between a few pounds to a considerable number of tons it will be obvious that a number of different sizes of my ways will be required and that while the clamping means 26 are considered suitable for securing the frames 20 of the smaller and medium size ways in their adjusted positions it is deemed advisable that at least the largest size of ways be provided with the heavy-duty interlocking positive type of adjustment shown in Figure 6. In this form the ribs 44 of the pair of ways are provided with the counterbored holes 45 to rotatably receive upright shafts 46 which are rotatably and detachably secured therein as by the groove and threaded pin connection 47. The shafts 46 are provided with threads 48 which engage like threads in the bores 52 formed in the lugs 51 of the carrier frame 50. The upper end of the shafts 46 are provided with a polygonal-shaped portion 49 with which a tool may be engaged to turn the shafts, thereby to raise or lower the frame to a desired position of adjustment, and to retain the adjustment the lugs 51 are slotted as at 54 and provided with a thumbscrew 55 similar to the slot 24 and the thumbscrew 25, as best shown in Figure 1. The lower end of the shafts bear against the supporting surface upon which the ways are placed to support the load they carry and may, if desired, be provided with an enlarged portion to better distribute their load.

The present method of locating and correcting the imbalance of a rotatable element of a machine at its place of use, say for example the rotor of an industrial air fan, is to remove an access door to expose its fan rotor and to apply one or more of a series of temporary balancing weights to the inner edge or heel of its rotor blades to locate and overcome its imbalance. These temporary weights are formed as or with spring clips and are applied by being forced over the heel of the blades. The reason they have been so applied is to prevent them from being displaced by centrifugal force as they would be if applied to the outer or tip end of the blades when the rotor is rotated at its normal running speed to check its balance. There are many advantages in applying the permanent weight as close to the outer periphery of the fan rotor as possible, one being that a smaller and lighter weight applied near the tip of a blade obviously has the same balancing effect as a larger and heavier weight applied at its heel. One disadvantage of the present method is that when the desired balance is obtained by so applying a temporary weight or weights, the size, weight and location of a permanent weight must be computed or estimated. Thereafter the temporary weights are removed, a permanent weight or weights computed or estimated to produce the same balance as the temporary weights are secured to the tip of the blade of the rotor and the latter is again run at its normal speed to check its balance.

The blades of fan rotors are usually curved radially, thus making it more difficult to accurately compute or estimate the proper weight and location of the permanent weight, and notwithstanding the time this procedure entails it usually has to be repeated a number of times to balance the rotor by permanent weights within permissible limits of imbalance. Furthermore, the time required to make each running check of the balance of the rotor is such that only a few runs can be made in a working day so that balancing a rotor by using the prior method is very costly.

Therefore I have devised an improved method and means of statically balancing the rotatable elements of a machine, especially the fan rotor of industrial air fans, quickly and effectively. My improved method preferably includes the use of the above described static balancing ways together with a graduated series of pairs of temporary and permanent balancing weights each pair of which is identical both as to shape and weight. My method does not require that the rotor be run, so that the temporary weights need not be secured to the heel of the fan blades as heretofore but being magnetized may be more advantageously located and magnetically secured to the metal annular side plates of a fan rotor adjacent its outer periphery, to quickly locate and correct its imbalance. After thus obtaining the desired static balance the location of the temporary weights are accurately marked and their weight noted on the side plates and then they are removed therefrom. Thereafter a permanent weight identical in shape and weight to the temporary weight it is to replace is accurately located in the position marked on the side plate and permanently secured in place by any suitable means, which will not alter its weight. Assuming that the rotor has been balanced within permissible limits by using my temporary weights the substitution of the permanent weights does not alter its balance so that by using my improved method and means it is now possible to statically balance rotatable elements of machines within permissible limits at a considerable saving of time and expense over prior methods and means.

It should be understood that the herein shown and described forms of my invention are intended to exemplify its principles and that various modifications and rearrangements may be made within the scope of the appended claims, wherein I claim:

1. A compact portable pair of static balancing ways each formed to be substituted for and in the place normally occupied by the pillow block bearings for a rotatable element of a machine, thereby to support the element in its normal running position in the machine during a static balancing operation, each way including a flat bottom frame provided with a pair of wide faced spaced and parallel rollers freely journaled in the side walls thereof and located to engage and support the rotatable element thereabove, a flat bottom base member provided with a pair of spaced upright rods each secured to one end of the base with its axis normal to the flat bottom of said member, and manually operable means between the frame and each rod for engaging and securing said frame in selected positions upon the rods, whereby the ways may be substituted for different sizes of pillow block bearings and each frame may be positioned and secured upon the rods in positions selected to rotatably support the rotatable element in its normal running position in the machine.

2. A compact portable pair of static balancing ways as set forth in claim 1 wherein the manually operable means include manually operable clamp means carried by the frame and engaged with each of the rods and are each securable thereon in positions selected to rotatably support the rotatable element in its normal running position in the machine.

3. A compact portable pair of static balancing ways as set forth in claim 1 wherein the rods are each rotatably secured to the base and each have threaded engagement with the frame, whereby equal rotation of the rods causes proportionate vertical movement of the frame between selected element supporting positions.

4. A compact portable pair of static balancing ways as set forth in claim 3 wherein the threaded rod engaging portions of the frame each include a clamping means manually operable to allow and prevent frame positioning rotation of the associated rod.

References Cited in the file of this patent

UNITED STATES PATENTS

| | | |
|---|---|---|
| 416,253 | Bordman | Dec. 3, 1889 |
| 782,024 | Heise | Feb. 7, 1905 |
| 1,003,753 | Jost | Sept. 19, 1911 |
| 1,292,280 | Ekstrom | Jan. 21, 1919 |
| 2,697,345 | Currier | Dec. 21, 1954 |

FOREIGN PATENTS

| | | |
|---|---|---|
| 413,959 | Germany | June 21, 1924 |